United States Patent
Pettersson

(10) Patent No.: US 9,827,991 B2
(45) Date of Patent: Nov. 28, 2017

(54) METHOD AND SYSTEM FOR DETERMINING A ROAD CONDITION

(71) Applicant: HEXAGON TECHNOLOGY CENTER GMBH, Heerbrugg (CH)

(72) Inventor: Bo Pettersson, Luxembourg (LU)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 18 days.

(21) Appl. No.: 15/045,026

(22) Filed: Feb. 16, 2016

(65) Prior Publication Data

US 2016/0236689 A1 Aug. 18, 2016

(30) Foreign Application Priority Data

Feb. 17, 2015 (EP) .................................... 15155353

(51) Int. Cl.
*B60W 40/06* (2012.01)
*G07C 5/00* (2006.01)
(Continued)

(52) U.S. Cl.
CPC ............. *B60W 40/06* (2013.01); *B60T 8/172* (2013.01); *G05D 1/0278* (2013.01); *G07C 5/008* (2013.01);
(Continued)

(58) Field of Classification Search
CPC ........... B60W 40/06; B60W 2300/125; B60W 2300/28; B60W 2422/70;
(Continued)

(56) References Cited

U.S. PATENT DOCUMENTS

| 5,736,939 A | 4/1998 | Corcoran |
| 6,324,461 B1 * | 11/2001 | Yamaguchi ............. B60T 8/172 |
| | | 180/197 |

(Continued)

FOREIGN PATENT DOCUMENTS

| AU | 750722 B2 | 7/2002 |
| DE | 198 56 610 A1 | 6/1999 |

OTHER PUBLICATIONS

European Search Report dated Jul. 17, 2015 as received in Application No. 15155353.4.
(Continued)

*Primary Examiner* — Atul Trivedi
(74) *Attorney, Agent, or Firm* — Maschoff Brennan

(57) ABSTRACT

The invention pertains to a road condition determining system and a method for determining a condition of a road traversed by at least one vehicle. The road condition determining system comprises a vehicle position determination means for determining a position of the vehicle, a calibration parameter detection unit adapted to determine at least one calibration parameter of a part of the vehicle, a vertical acceleration sensor adapted to continuously sense a vertical acceleration of the vehicle, a calculation unit adapted to calculate a road condition value based on the vertical acceleration and on the calibration parameter, and to continuously monitor whether the road condition value exceeds a predefined schedule, and a data transmission unit adapted to provide maintenance data to at least one receiver, the maintenance data comprising at least an information about the vehicle position.

16 Claims, 4 Drawing Sheets

(51) Int. Cl.
*B60T 8/172* (2006.01)
*G05D 1/02* (2006.01)

(52) U.S. Cl.
CPC ..... *B60T 2201/022* (2013.01); *B60T 2210/12* (2013.01); *B60T 2210/36* (2013.01); *B60W 2300/125* (2013.01); *B60W 2300/28* (2013.01); *B60W 2422/70* (2013.01); *B60W 2520/105* (2013.01); *B60W 2750/40* (2013.01)

(58) Field of Classification Search
CPC ........ B60W 2520/105; B60W 2750/40; G07C 5/008; B60T 2210/12; B60T 2210/36; B60T 8/172; B60T 2201/022; G05D 1/0278
USPC ........................................................ 701/500
See application file for complete search history.

(56) References Cited

U.S. PATENT DOCUMENTS

| | | | | |
|---|---|---|---|---|
| 6,374,173 | B1* | 4/2002 | Ehlbeck | B60K 31/047 |
| | | | | 180/170 |
| 6,484,089 | B1 | 11/2002 | Millington | |
| 8,275,516 | B2* | 9/2012 | Murphy | A01B 69/00 |
| | | | | 701/124 |
| 9,517,774 | B2* | 12/2016 | Yu | B60W 40/13 |
| 2004/0107042 | A1 | 6/2004 | Seick | |
| 2004/0122580 | A1 | 6/2004 | Sorrells | |
| 2009/0228174 | A1* | 9/2009 | Takagi | B60T 8/17558 |
| | | | | 701/41 |
| 2009/0292483 | A1 | 11/2009 | Journade et al. | |
| 2010/0097208 | A1* | 4/2010 | Rosing | G06Q 10/087 |
| | | | | 340/539.13 |
| 2010/0152942 | A1 | 6/2010 | Stratton et al. | |
| 2010/0280751 | A1* | 11/2010 | Breed | G08G 1/161 |
| | | | | 701/414 |
| 2011/0254676 | A1* | 10/2011 | Marumoto | G07C 5/008 |
| | | | | 340/441 |
| 2011/0304447 | A1* | 12/2011 | Marumoto | G07C 5/085 |
| | | | | 340/438 |
| 2012/0253587 | A1* | 10/2012 | Davidson | G06Q 10/08 |
| | | | | 701/29.3 |
| 2013/0035827 | A1* | 2/2013 | Breed | B60R 21/0132 |
| | | | | 701/45 |
| 2014/0067154 | A1* | 3/2014 | Yu | B60W 40/076 |
| | | | | 701/1 |
| 2014/0180557 | A1* | 6/2014 | Hunt | B60T 8/172 |
| | | | | 701/99 |
| 2016/0063864 | A1* | 3/2016 | Ohsugi | B60P 1/286 |
| | | | | 701/301 |
| 2016/0264133 | A1* | 9/2016 | Ohsugi | G08G 1/166 |

OTHER PUBLICATIONS

"The development of a real-time mine road maintenance management system using haul truck and road vibration signature analysis" by Thompson, Visser, Miller, 25 and Lowe (published in "The Journal of the South African Institute of Mining and Metallurgy", Jun. 2003).

* cited by examiner

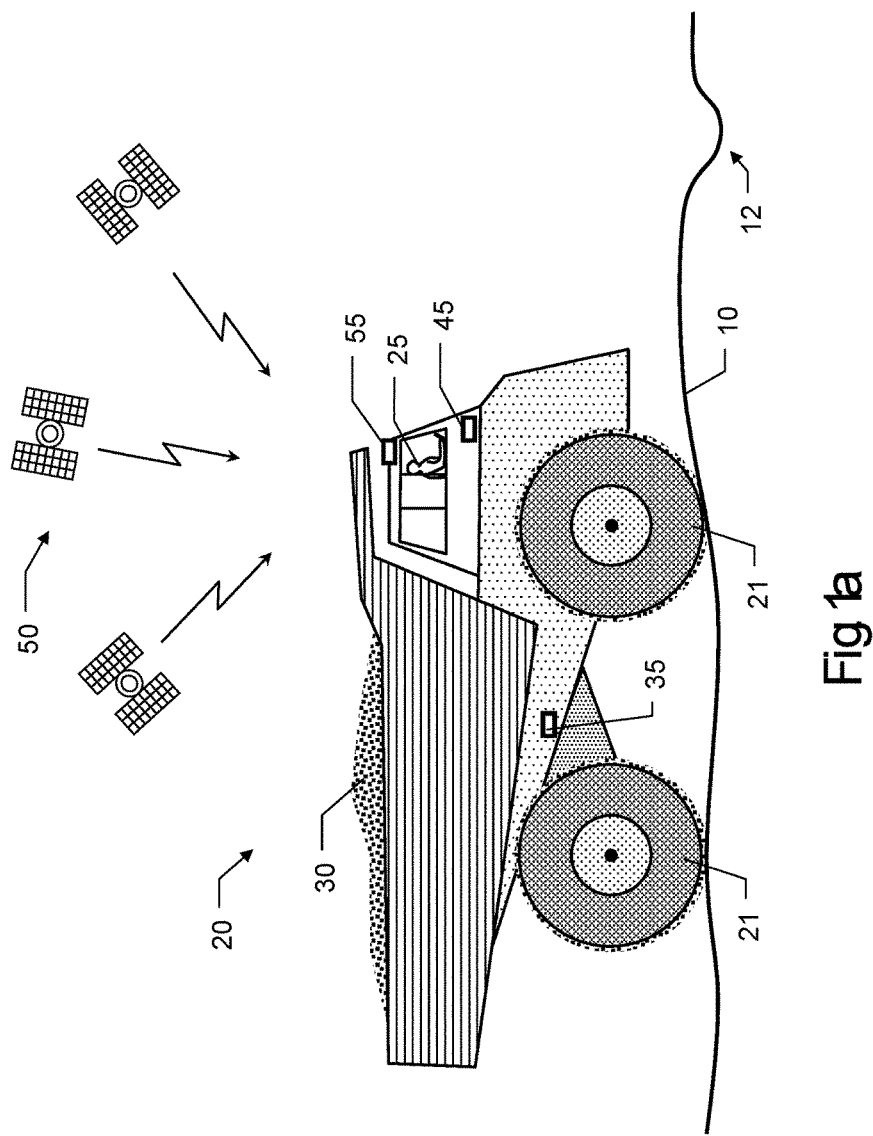

METHOD AND SYSTEM FOR DETERMINING A ROAD CONDITION

FIELD

The present invention pertains generally to a method and a system for determining a condition of a road and more specifically to a device and method for monitoring a set of parameters of a vehicle and responsively determining the condition of the road that the vehicle uses. Particularly, the method and system can be used for load hauling machines travelling over haul roads.

BACKGROUND

Load hauling machine fleets are frequently used for hauling material throughout work sites. In large open mining sites, in remote forests or on large-scale construction sites, where load hauling machines are used to haul materials—such as ore, coal, logs and building or waste material—from one location to another, haul roads are created for the trucks to travel on and then need to be maintained. Often, these haul roads are located in harsh and constantly changing environments and therefore require constant monitoring and frequent maintenance in order to keep them suitable for the load hauling machines to travel on. Deterioration of the haul roads, road damages or obstacles on the road can cause severe and costly damage to the load hauling machines and slow down the traffic on the road.

In the paper "The development of a real-time mine road maintenance management system using haul truck and road vibration signature analysis" by Thompson, Visser, Miller, and Lowe (published in "The Journal of The South African Institute of Mining and Metallurgy", June 2003), a similar method is described, where a triaxial accelerometer is placed on the vehicle to analyze the road condition and to allow running a road maintenance management system efficiently.

U.S. Pat. No. 5,736,939 A discloses another device and method for use with load hauling machines for use on mining sites. Therein, the condition of the wheels and other parameters are monitored to determine the condition of the road.

In both approaches, when a vehicle runs through a pothole or over a rock on the road, this event is recorded together with the position, e.g. determined by means of GPS. Then a warning can be issued to other vehicles and road maintenance can be informed about the road defect, so that the pothole or rock can be removed quickly.

However, in neither of the above mentioned documents, the human factor is taken into account sufficiently. If a road damage or obstacle on the road, e.g. a pothole or rock on the road, has a certain size, so that on the one hand it is big enough for the driver of a vehicle to see it in due time before hitting it, and on the other hand is small enough so that it is possible to avoid hitting it, the driver could try to avoid hitting the obstacle and, if possible, rather steer the car around it. Although this behaviour may prevent damage to the car and/or damage or partial loss of the load, it may however still be time-consuming, especially if repeated often. What is more, with the available methods, no event is triggered if the obstacle is avoided, so that the road surface defect is not reported, other drivers cannot be warned and the defect will not be repaired.

SUMMARY

Some embodiments of the invention provide an improved device and method for determining a road condition.

Some embodiments of the invention provide such a device and method, wherein a road surface defect is also determinable when the vehicle drivers avoid hitting the defect.

It is a further object to provide such a device and method for use with load hauling machines.

Another object is to provide such a device and method with cheaper means, particularly with a more cost-effective use of sensors already existing in the vehicle.

Some embodiments of the invention pertains to a method for determining a condition of a road traversed by at least one vehicle, the method comprising determining at least one calibration parameter of a part of the vehicle, continuously sensing a vertical acceleration of the vehicle, calculating a road condition value based on the vertical acceleration and on the calibration parameter, and continuously monitoring whether the road condition value exceeds a predefined schedule, triggering a road maintenance event if the schedule is exceeded.

According to some embodiments of the invention, in case of a triggered road maintenance event, the method further comprises determining or deriving a vehicle position at the time of the road maintenance event, and providing event data to at least one receiver, the event data comprising information about the vehicle position and at least one road condition value.

In some embodiments of the invention, the vehicle may be a load hauling machine adapted to transport a heavy load, and the vertical acceleration is determined by means of a scale of the load hauling machine adapted to determine the weight of the load and/or by means of at least one air pressure sensor of at least one wheel.

In some embodiments, the method comprises continuously sensing a horizontal acceleration of the vehicle, particularly wherein calculating the road condition value is also based on the horizontal acceleration.

In some embodiments, the method comprises continuously monitoring the occurrence of an evasion event, the evasion event comprising an evasive movement of the vehicle, wherein in case of an evasion event, the method further comprises determining or deriving a vehicle position at the time of the evasion event, and providing event data to the receiver, the event data comprising information about the vehicle position and information about the evasive movement.

In some embodiments, monitoring the evasion event comprises continuously sensing a horizontal acceleration of the vehicle, particularly a horizontal acceleration basically orthogonal to a driving direction of the vehicle.

In some embodiments, monitoring the evasion event comprises continuously monitoring whether the horizontal acceleration exceeds a predetermined threshold value.

In some embodiments, monitoring the evasion event comprises monitoring a user input, particularly an input of the driver of the vehicle, the user input comprising an oral or manual command related to an evasion event of the vehicle.

In some embodiments, the at least one receiver is situated at a road maintenance facility, and the provided event data is used for generating a maintenance plan for the road, particularly wherein data is provided by a multitude of vehicles to the receiver.

In some embodiments, the at least one receiver is situated in at least one further vehicle traversing on said road, and the provided data is used for issuing a warning if the further vehicle approaches a position described by the provided position data.

In some embodiments of the invention also pertain to a road condition determining system adapted to determine a condition of a road traversed by at least one vehicle, comprising a vehicle position determination means for determining a position of the vehicle, a calibration parameter detection unit adapted to determine at least one calibration parameter of a part of the vehicle, a vertical acceleration sensor, adapted to continuously sense a vertical acceleration of the vehicle, and a calculation unit adapted to calculate a road condition value based on the vertical acceleration and on the calibration parameter, and to continuously monitor whether the road condition value exceeds a predefined schedule.

In some embodiments, the road condition determining system comprises a data transmission unit adapted to provide maintenance data to at least one receiver, the maintenance data comprising at least an information about the vehicle position.

In some embodiments, the vehicle is a load hauling machine adapted to transport a heavy load, and the vertical acceleration sensor is a scale of the load hauling machine adapted to determine the weight of the load and/or at least one air pressure sensor of at least one wheel of the vehicle.

In some embodiments, the vehicle is a racing car and the road is a racing track or a test track, or the vehicle is an airplane and the road is a runway.

In some embodiments, the data transmission unit is adapted to provide the maintenance data if the road condition value exceeds the predefined schedule. Particularly, the calculation unit is adapted to trigger a road maintenance event if the road condition value exceeds the predefined schedule, and the data transmission unit is adapted to provide the maintenance data if the road maintenance event is triggered.

In some embodiments, of the road condition determining system, the maintenance data comprises at least one road condition value.

In some embodiments, the road condition determining system according to the invention comprises an evasion detection unit that is adapted to continuously monitor the occurrence of an evasion event related to an evasive movement of the vehicle, wherein the data transmission unit is adapted to provide the maintenance data in case of an evasion event, particularly wherein the maintenance data comprises information about the evasion event.

In some embodiments, the evasion detection unit comprises a horizontal acceleration sensor adapted to continuously sense a horizontal acceleration of the vehicle, particularly at least a horizontal acceleration basically orthogonal to a driving direction of the vehicle, and is adapted to continuously monitor the occurrence of an evasion event based on the horizontal acceleration. Particularly, the evasion detection unit is adapted to trigger an evasion event if the horizontal acceleration exceeds a predefined schedule and/or if the horizontal acceleration occurs according to a predefined pattern. Particularly, the data transmission unit is adapted to provide the maintenance data if the evasion event is triggered.

In some embodiments, a triaxial acceleration sensor adapted to sense vertical and horizontal accelerations of the vehicle, wherein the vertical acceleration sensor is embodied by the triaxial acceleration sensor, and/or the horizontal acceleration sensor is embodied by the triaxial acceleration sensor.

The invention also pertains to a computer program product comprising program code which is stored on a machine-readable medium, or being embodied by an electromagnetic wave comprising a program code segment, and having computer-executable instructions for performing, particularly when executed on a computing unit of road condition determining system according to the invention, the following steps of the method according to the invention: calculating a road condition value based on the vertical acceleration and on the calibration parameter, continuously monitoring whether the road condition value exceeds a predefined schedule, triggering a road maintenance event if the schedule is exceeded, determining or deriving a vehicle position at the time of the road maintenance event, and providing event data to at least one receiver, the event data comprising information about the vehicle position and at least one road condition value.

BRIEF DESCRIPTION OF THE DRAWINGS

The invention in the following will be described in detail by referring to example embodiments that are accompanied by figures, in which:

FIGS. 1a-b show a load hauling machine comprising an example embodiment of a system for determining a condition of a road according to the invention;

DETAILED DESCRIPTION

Figure 1B:
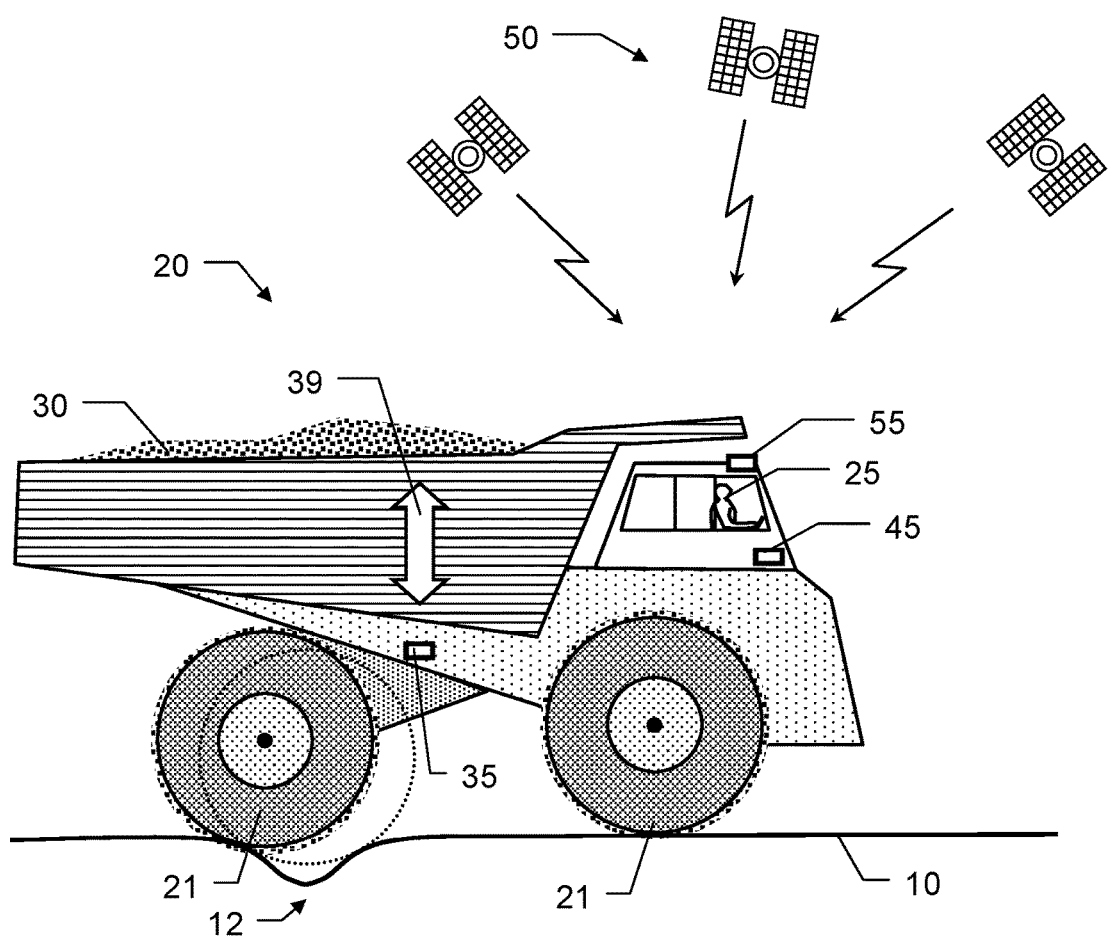

In FIGS. 1a and 1b, a load hauling machine 20 is depicted as an example for a vehicle that is equippable with a road condition determining system according to the invention.

In FIG. 1a, the load hauling machine 20 is travelling over a road 10 and approaching a pothole 12 as an example of a road damage that would require road maintenance service. The load hauling machine 20 is designed to haul a load 30, in this case bulk material, from one point to another, thereby travelling over the road 10, driven by a driver 25. The load hauling machine 20 is equipped with a road condition determining system that comprises a number of components 35,45,55,75 and is adapted to determine the condition of the road 10.

A first component is a vertical acceleration sensor 35. It is adapted to continuously sense a vertical acceleration of the load hauling machine 20 while travelling over the road 10 and to detect sudden changes of the vertical acceleration caused by uneven road conditions such as bumps or potholes. In this example, the vertical acceleration sensor 35 is embodied by a scale of the loading area. Using the scale of the load hauling machine 20 has the advantage that no additional sensor is needed. Alternatively, also pressure sensors of the wheels 21 could be used to determine the vertical acceleration.

A second component is a horizontal acceleration sensor 45 which is adapted to continuously sense a horizontal acceleration of the load hauling machine 20, particularly at least a horizontal acceleration that is basically orthogonal to the driving direction.

A third component is a vehicle position determination means 55 that is adapted to determine a position of the vehicle. In this example, the vehicle position determination means 55 is satellite 50 based, e.g. comprising a GNSS sensor.

A fourth component is a data transmission unit 75 adapted to provide position data and road condition data to an external receiver or a multitude of external receivers, which e.g. can be situated at a road maintenance facility, so that the provided data can be used for generating a maintenance plan for the road 10, or in another vehicle traversing on said road 10, so that the provided data can be used for issuing a warning if the further vehicle approaches a road damage.

In FIG. 1*b*, the load hauling machine 20 hits the pothole 12 with one of its wheels 21. This generates a sudden vertical acceleration 39 of the load hauling machine 20 which is determinable by the vertical acceleration sensor 35. This triggers a road maintenance event, in the course of which the actual position of the vehicle is determined or derived by the vehicle position determination means 55, and position data and road condition data are transmitted by the data transmission unit 75 to the external receiver or receivers. The system is adapted to determine the presence of road defects such as potholes, fixed stones, washboards, humps and ditches, when the load hauling machine 20 runs over these damages. In a particular embodiment, the system is adapted to interpret vertical acceleration data as a certain road defect and to report this road defect when transmitting the road condition data. Alternatively, the collected acceleration data can be transmitted and interpreted at a road maintenance central. The interpretation particularly is based on identifying typical distributions of high and low acceleration values.

The road condition determining system can optionally comprise further components that e.g. monitor the condition of the wheels 21 or other parameters of the vehicle 20. These parameters can then be used to define a threshold for the vertical acceleration 39, the exceeding of which triggers the road maintenance event. Particularly, the threshold can depend on parameters influencing the amount of vertical acceleration forces, e.g. the wheels' current inflation level, the speed of the vehicle 20 or the weight of the hauled load 30.

Figure 2A:
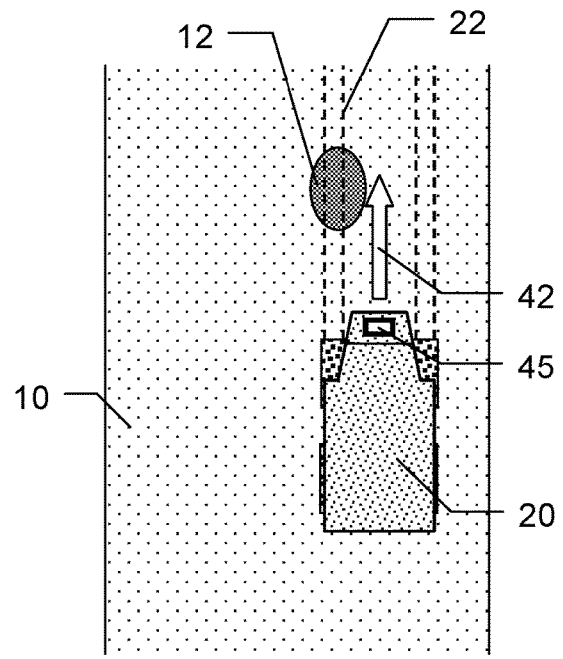
FIGS. 2a-b show a load hauling machine comprising an example embodiment of a road determination system according to the invention, having an evasion detection functionality.
Figure 2B:
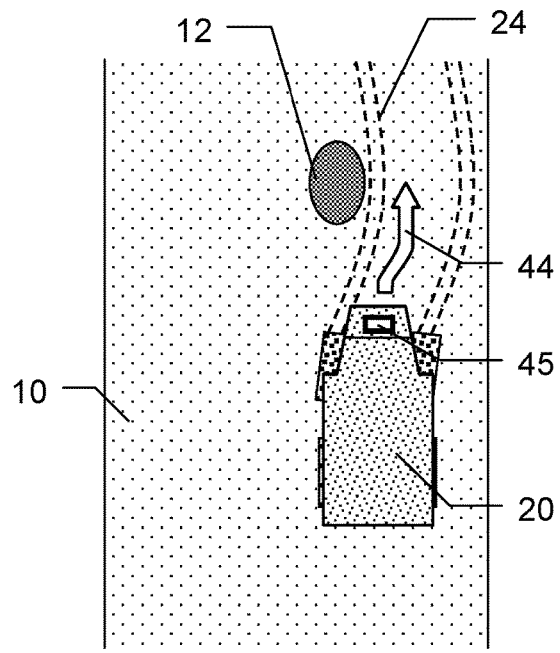

FIGS. 2*a* and 2*b* show the load hauling machine 20 in a top view, the load hauling machine 20 travelling on a road 10 and approaching a pothole 12.

In FIG. 2*a*, the load hauling machine 20 maintains its initial driving direction 22, not trying to avoid the obstacle. This leads to the triggering of a road maintenance event, as described with respect to FIG. 1*b*.

In FIG. 2*b*, the driver of the load hauling machine 20 decides to avoid the pothole 12, steering the vehicle around it in an evasive movement 24. As the load hauling machine 20 does not hit the pothole 12, no unusual vertical acceleration occurs and, thus, no road maintenance event is triggered. If this road damage is avoided every time—for instance because on the one hand it is noticeable well in advance by the drivers and on the other hand is so big that it might cause damages to the vehicle or load or discomfort to the driver if it is not avoided—it will remain unnoticed by the road maintenance service and thus unrepaired.

In this embodiment of the invention, the vehicle's road condition determining system therefore comprises a horizontal acceleration sensor 45 that is adapted to detect the evasive movement 24 of the load hauling machine 20. If the horizontal acceleration orthogonally to the driving direction exceeds a predefined threshold and/or reveals a typical evasive movement pattern, an evasion event 44 is triggered, in the course of which the actual position of the vehicle is determined or derived by the vehicle position determination means, and position data and information about the evasion event 44 are transmitted by the data transmission unit to the external receiver or receivers.

The evasion event 44 can then be interpreted as a potentially dangerous road damage or obstacle that requires road maintenance service. However, as evasive movements 22 can occur also because of other reasons than road damages or obstacles on the road 10 (e.g. traversing animals or persons), preferably road maintenance service might be assumed necessary only after two or more evasion events 44 at the same position. Optionally, the predefined threshold can depend on parameters influencing the amount of horizontal acceleration forces, e.g. the wheels' current inflation level, the speed of the vehicle 20 or the weight of the hauled load 30. A typical evasive movement pattern that could be interpreted as an evasion event 44 may comprise a "zigzag" movement with alternating movements of the vehicle 20 to the right and to the left.

Figure 3:
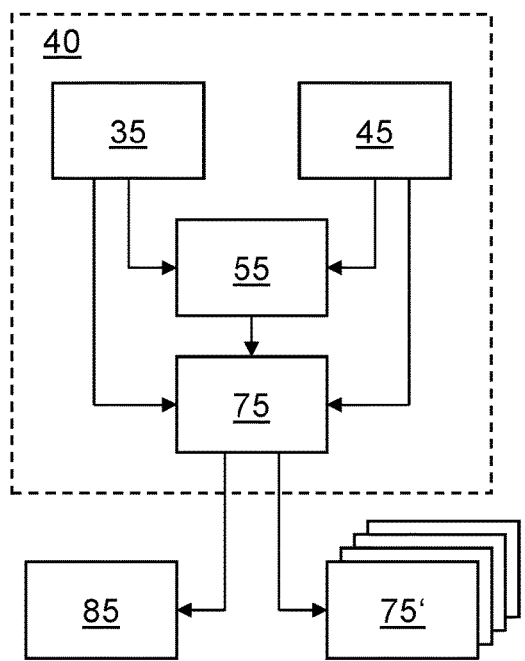
FIG. 3 is a flow-chart illustrating the flow of information in an example embodiment of a road d determination system according to the invention.

FIG. 3 shows the flow of information in an exemplary embodiment of a road determination system 40 and to external receivers 75',85. The depicted system comprises a vertical acceleration sensor 35, a horizontal acceleration sensor 45, a vehicle position determination means 55 and a data transmission unit 75.

In the case of a road maintenance event detected by the vertical acceleration sensor 35, the vehicle position determination means 55 determines a vehicle position, and the data transmission unit 75 transmits data comprising information about the road maintenance event and the vehicle position to a road maintenance facility 85 and/or one or more other vehicles' data transmission units 75' as external receivers.

In the case of an evasion event detected by the horizontal acceleration sensor 45, the vehicle position determination means 55 determines a vehicle position, and the data transmission unit 75 transmits data comprising information about the evasion event and the vehicle position to a road maintenance facility 85 and/or one or more other vehicles' data transmission units 75' as external receivers.

Figure 4:
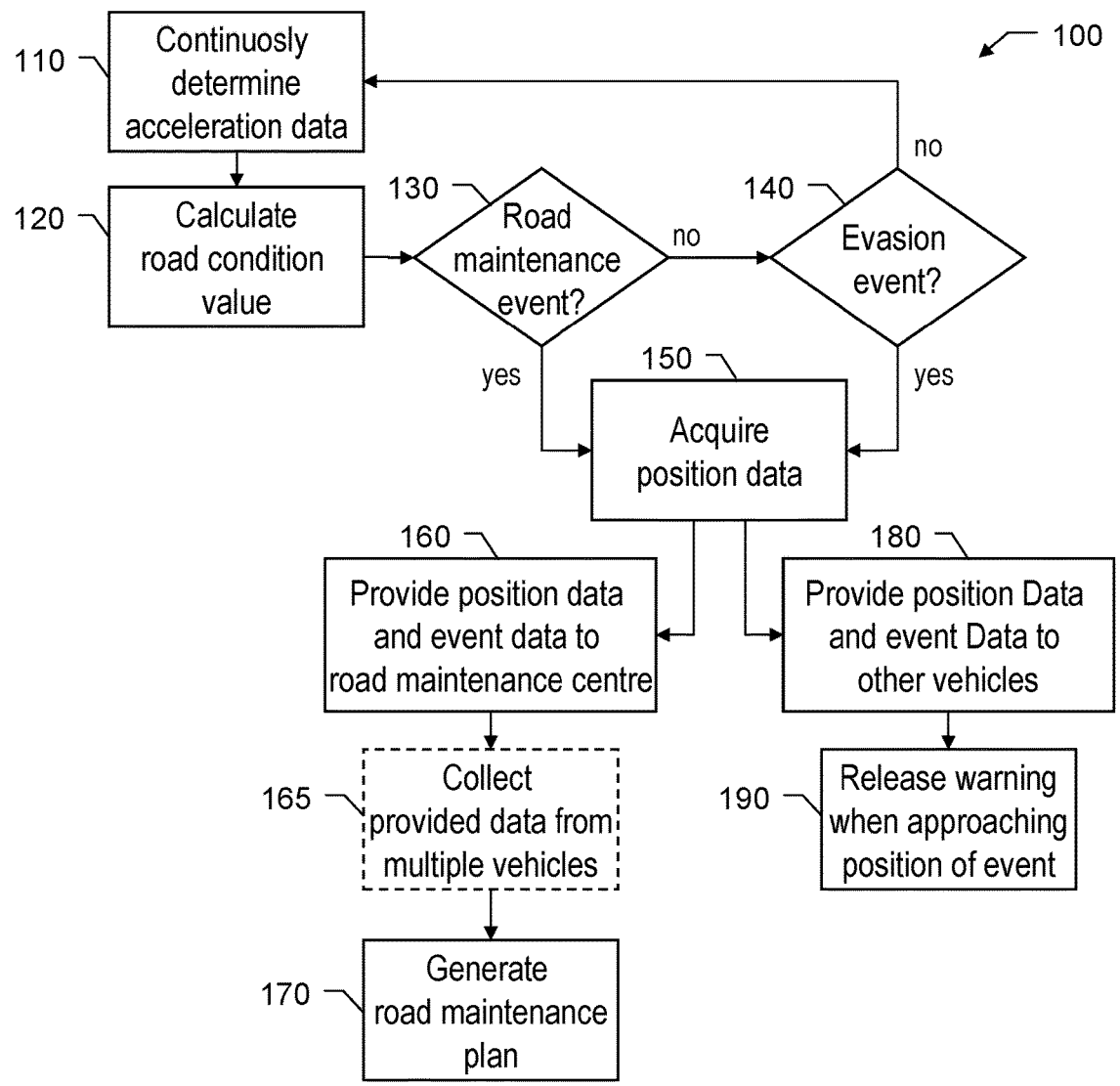
FIG. 4 is a flow-chart illustrating an exemplary embodiment of a method for determining a condition of a road according to the invention.

FIG. 4 illustrates an exemplary embodiment of a method 100 for determining a condition of a road according to the invention. The method 100 comprises continuously determining acceleration data of a vehicle traversing the road (step 110), and calculating a road condition value based on the road condition value (step 120). The method further comprises monitoring whether a road maintenance event occurs (step 130), i.e. whether the calculated road condition value exceeds a predetermined threshold, and, if none occurs, monitoring whether an evasion event occurs (step 140), i.e. whether a horizontal acceleration value exceeds a predetermined threshold. If neither occurs, the method 100 continues with step 110.

If a road maintenance event or an evasion event occurs, position data of the vehicle at the moment of the event is acquired in step 150. The position data and information about the road maintenance event or the evasion event, respectively, are provided to at least one receiver.

If the data is provided to a road maintenance center (step 160), it will be used to generate a road maintenance plan (step 170), particularly whereby data provided by a multitude of vehicles is collected for generating the road maintenance plan (step 165). If the data is provided to other vehicles (step 180), it will be used in step 190 to release a warning to the driver when the vehicle approaches the position of the road maintenance event or the evasion event, respectively.

Although in this document the method and system are described mainly with the example of load hauling machines, according to the invention they are not limited to this special kind of vehicle. For instance, the system could as well be installed in racing cars for determining the condition of a race track or a test track, or in airplanes for determining the condition of the runway.

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for determining a condition of a road traversed by at least one vehicle, the method comprising
    determining at least one calibration parameter of a part of the vehicle,
    continuously sensing a vertical acceleration of the vehicle,
    continuously sensing a horizontal acceleration of the vehicle,
    calculating a road condition value based on the vertical acceleration and on the calibration parameter,
    continuously monitoring whether the road condition value exceeds a predefined schedule, triggering a road maintenance event if the schedule is exceeded,
    continuously monitoring whether the horizontal acceleration exceeds a predetermined threshold value and occurs according to a predefined pattern, triggering an evasion event if the threshold value is exceeded and/or the predefined pattern occurs, the evasion event comprising an evasive movement of the vehicle,
    wherein, in the event of a triggered road maintenance event or evasion event, the method further comprises:
    determining or deriving a vehicle position at the time of the road maintenance event or evasion event, respectively, and
    providing event data to at least one receiver, the event data comprising information about the vehicle position and either at least one road condition value or information about the evasive movement.

2. The method according to claim 1, wherein:
    the vehicle is a load hauling machine adapted to transport a heavy load, and the vertical acceleration is determined by means of a scale of the load hauling machine adapted to determine the weight of the load and/or by means of at least one air pressure sensor of at least one wheel.

3. The method according to claim 1, wherein:
    calculating the road condition value is also based on the horizontal acceleration.

4. The method according to claim 1, wherein: monitoring the evasion event comprises continuously sensing a horizontal acceleration basically orthogonal to a driving direction of the vehicle.

5. The method according to claim 1, wherein: monitoring the evasion event comprises monitoring a user input, the user input comprising an oral or manual command related to an evasion event of the vehicle.

6. The method according to claim 1, wherein the at least one receiver is situated at a road maintenance facility, and the provided event data is used for generating a maintenance plan for the road, wherein data is provided to the receiver by a multitude of vehicles.

7. The method according to claim 1, wherein the at least one receiver is situated in at least one further vehicle traversing on said road, and the provided data is used for issuing a warning if the further vehicle approaches a position described by the provided position data.

8. A road condition determining system adapted to determine a condition of a road traversed by at least one vehicle, comprising
    a vehicle position determination means for determining a position of the vehicle;
    a calibration parameter detection unit adapted to determine at least one calibration parameter of a part of the vehicle;
    a vertical acceleration sensor, adapted to continuously sense a vertical acceleration of the vehicle;
    a horizontal acceleration sensor adapted to continuously sense a horizontal acceleration of the vehicle;
    a calculation unit adapted to calculate a road condition value based on the vertical acceleration and on the calibration parameter, and to continuously monitor whether the road condition value exceeds a predefined schedule;
    an evasion detection unit adapted to continuously monitor the occurrence of an evasion event related to an evasive movement of the vehicle based on the horizontal acceleration, wherein the evasion detection unit is adapted to trigger an evasion event if the horizontal acceleration exceeds a predefined schedule and occurs according to a predefined pattern, and
    a data transmission unit adapted to provide maintenance data to at least one receiver in case of an evasion event and in case that the road condition value exceeds the predefined schedule, the maintenance data comprising at least an information about the vehicle position.

9. The road condition determining system according to claim 8, wherein:
    the vehicle is a load hauling machine adapted to transport a heavy load, and the vertical acceleration sensor is a scale of the load hauling machine adapted to determine the weight of the load.

10. The road condition determining system according to claim 8, wherein:
    the vehicle is a load hauling machine adapted to transport a heavy load, and the vertical acceleration sensor is at least one air pressure sensor of at least one wheel of the vehicle.

11. The road condition determining system according to claim 8, wherein the vehicle is a racing car and the road is a race track or a test track.

12. The road condition determining system according to claim 11, further comprising a triaxial acceleration sensor adapted to sense vertical and horizontal accelerations of the vehicle, wherein the vertical acceleration sensor is embodied by the triaxial acceleration sensor.

13. The road condition determining system according to claim 11, further comprising a triaxial acceleration sensor adapted to sense vertical and horizontal accelerations of the vehicle, wherein the horizontal acceleration sensor is embodied by the triaxial acceleration sensor.

14. The road condition determining system according to claim 8, wherein:
    the data transmission unit is adapted to provide the maintenance data if the road condition value exceeds the predefined schedule, wherein
    the calculation unit is adapted to trigger a road maintenance event if the road condition value exceeds the predefined schedule, and the data transmission unit is adapted to provide the maintenance data if the road maintenance event is triggered; and/or the maintenance data comprises at least one road condition value.

15. The road condition determining system according to claim 8, wherein in case of an evasion event, the maintenance data comprises information about the evasion event.

16. A non-transitory computer program product comprising program code which is stored on a machine-readable medium, or being embodied by an electromagnetic wave comprising a programme code segment, and having computer-executable instructions for performing, when executed on a computing unit of road condition determining system;

calculating a road condition value based on the vertical acceleration and on the calibration parameter, continuously monitoring whether the road condition value exceeds a predefined schedule, triggering a road maintenance event if the schedule is exceeded, determining or deriving a vehicle position at the time of the road maintenance event, and providing event data to at least one receiver, the event data comprising information about the vehicle position and at least one road condition value.

* * * * *